June 6, 1950

W. A. JOHNSON 2,510,698

RADIO AERIAL, PARTICULARLY FOR
AIRCRAFT AND OTHER VEHICLES

Filed July 28, 1947

WILLIAM ARTHUR JOHNSON
Inventor

By
Cushman, Darby & Cushman
Attorneys

June 6, 1950 W. A. JOHNSON 2,510,698
RADIO AERIAL, PARTICULARLY FOR
AIRCRAFT AND OTHER VEHICLES
Filed July 28, 1947 3 Sheets-Sheet 2

WILLIAM ARTHUR JOHNSON
Inventor

By Cushman, Darby & Cushman
Attorneys

June 6, 1950

W. A. JOHNSON 2,510,698

RADIO AERIAL, PARTICULARLY FOR AIRCRAFT AND OTHER VEHICLES

Filed July 28, 1947

WILLIAM ARTHUR JOHNSON
Inventor

By Cushman, Darby & Cushman
Attorneys

Patented June 6, 1950

2,510,698

UNITED STATES PATENT OFFICE 2,510,698

RADIO AERIAL, PARTICULARLY FOR AIRCRAFT AND OTHER VEHICLES

William Arthur Johnson, Farnborough, England, assignor to Minister of Supply in His Majesty's Government of the United Kingdom of Great Britain and Northern Ireland, London, England Application July 28, 1947, Serial No. 764,098
In Great Britain January 28, 1946

Section 1, Public Law 690, August 8, 1946
Patent expires January 28, 1966

1 Claim. (Cl. 250—33)

This invention relates to radio aerials and while being more especially applicable to aerials for aircraft and other mobile craft or vehicles, has application to fixed structures where it is not desired or possible to use the more common type of mast or cable aerial.

Due to the considerable increase in the speed of modern aircraft, structural difficulties arise in fitting aerials of common types. Thus a mast type of aerial or an aerial in the form of wire stretched between two suitable external points of the aircraft is subject to large aerodynamic forces such that it either becomes torn away from its supports, or due to its mechanical drag seriously interferes with the aerodynamic performance of the aircraft, besides being liable to a form of electrical interference known as precipitation static, as well as being a source of danger to the aircraft due to the possibility of fracture when flying at very high speeds approaching the speed of sound.

With a view to overcoming such difficulties and providing a simple and relatively unobtrusive radio aerial, the invention utilizes the metallic surface of the structure to which it is applied and inductively couples such metallic surface to radio transmitting or receiving equipment whereby the surface is excited by the inductive coupling to effect radiation when radio signals are being transmitted or the inductive coupling is excited by the currents induced in the surface by electro magnetic radiations of a received radio signal.

The inductive coupling may comprise one or more toroidal windings of wire which may either surround the metallic surface with the plane of the toroid or coil perpendicular to the axis of the surface or it may be concentrated at one or more points adjacent to the metallic surface.

In the particular application of the invention to aircraft the inductive coupling may be mounted adjacent to the wing root but external to the metal fuselage of the aircraft whereby it sets up a magnetic field encircling the wing root or a part thereof.

One feature of the invention resides in associating the inductive coupling with two metallic structural parts whose longitudinal axes are mutually inclined so that the two parts act as crossed dipoles: In the application of this feature of the invention to an aircraft the metallic wing and fuselage, or metallic portions of the fuselage and wing have an appropriate induction coil mounted adjacent to them in a manner which gives the required polar diagram of magnetic field.

In order that the invention may be readily understood and carried into effect, reference will now be made to the accompanying drawings, in which.

In the drawings related components are indicated by the same reference numerals with the addition of a suffix.

In accordance with the invention the method of radio transmission involves exciting currents in the wing and body structures of the aircraft so that these structural portions behave as aerials excitation being produced by coupling coils suitably placed in such relation to the aforesaid structural portions as will produce the radiation patterns required for radio signalling, these coils being energized by radio transmitters of any conventional types. Reciprocally the coupling coils may be excited by currents induced in the metallic structure of the aircraft by electro magnetic radiations and the coils are then able to excite conventional radio receivers.

Figure 1:
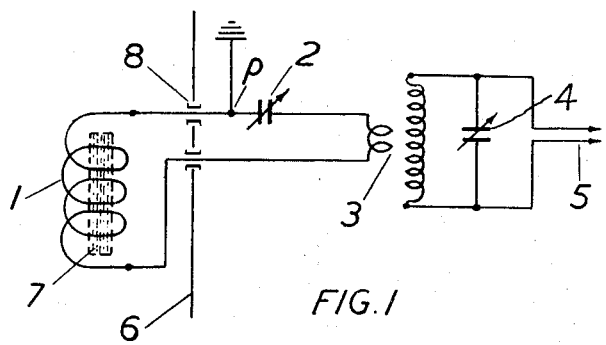
Figure 1 is an electrical circuit diagram of a practical embodiment of the invention.

Figure 1 of the accompanying drawings shows a simplified diagram of the circuit embodying the coupling coil of the aerial according to the invention, this circuit comprising the coupling coil 1, with or without a magnetic core 7, in series with a variable condenser 2, a coupling transformer 3, a tuning condenser 4, and a connection 5 to the radio transmitter and/or receiver. The radio transmitter and/or receiver are located at the radio operator's position or other convenient place in the aircraft, while components 1, 2, 3, 4, 5, and 7 are located at the most suitable positions in the aircraft structure, the tuning condenser 2 being remote controlled by the radio operator, or automatic, to provide resonant tuning of the coil circuit to cover variations in operating conditions. If the aerial system according to the invention is required to operate over a wide band of frequencies there can be added to the system additional remote control means of adjustment, such as tap changing switches on the coil and transformer, additional capacities variations to condenser 2 and variations to capacity 4.

The coil 1 is mounted on the outside of the metal structure but the remainder of the equipment may be, but not necessarily, mounted on the inside of the framework, close to the coil, connections to the coil 1 being made through insulators 8 in the metallic surface 6. One point p of the system is connected to ground through the metal work as shown.

The metal wing of the plane 6 is surrounded by a laminated iron core 7, on which is wound the coil 1, fed by conductors through insulators 8 in the metal surface of the wing, the tuning condenser 2, coupling transformer 3, condenser 4 and the connection 5 being housed inside the wing.

To reduce air resistance the coil 1 is enclosed in a covering of insulating material 9, and while the whole structure may be applied to any portion of the wing or fuselage it can most conveniently be located near the junction or root of a wing and fuselage, the cover forming at the same time the fairing between the two members. This system may be operated without the core 7 but with corresponding reduction in power.

Figure 2:
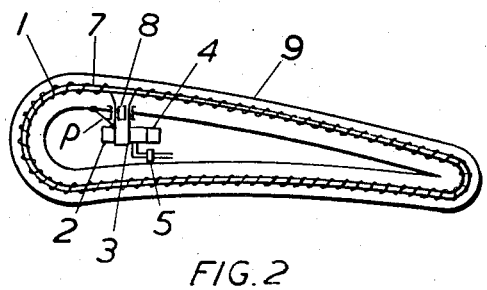
Figure 2 is a diagrammatic sectional view of an aircraft wing embodying the invention.
Figure 3:
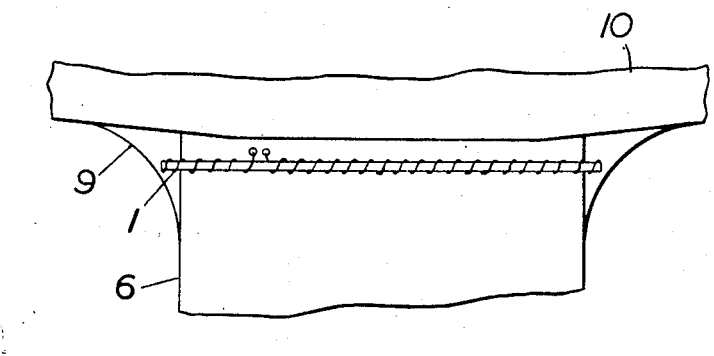
Figure 3 is a plan view corresponding to Figure 2.
Figure 4:
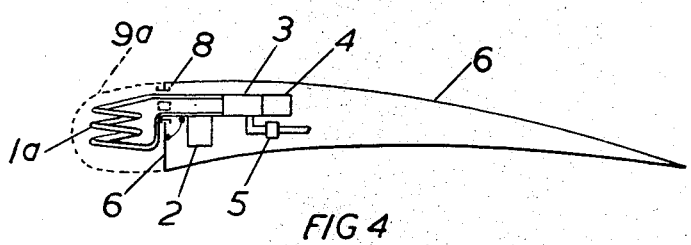
Figure 4 is a diagrammatic sectional view similar to Figure 2, but showing a further embodiment of the invention.
Figure 5:
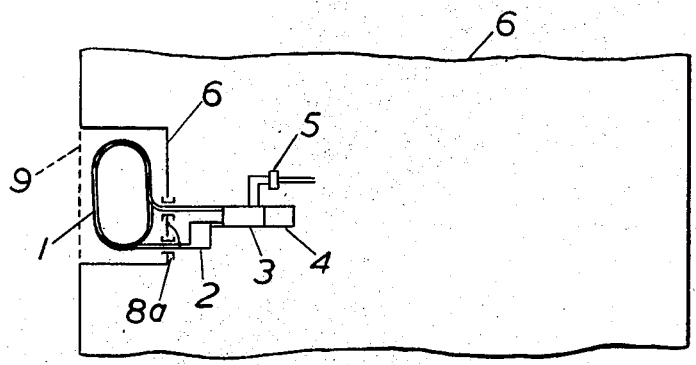
Figure 5 is a plan view corresponding to Figure 4.

It is found in practice that it is generally possible to use a coupling coil which does not extend completely round the member to be excited—as shown in Figures 2 and 3—but which concentrates the whole of the ampere turns of the coil at one point as illustrated in side view in Fig. 4 and in plan view Fig. 5. Here the coupling coil 1a consists of a few turns but carries a correspondingly larger current. It is mounted close to the metal structure 6 to be excited, the magnetic axis of the coil being about at right angles to the surface 6, of the structure near to which it is mounted. The drawings show part of the leading edge of the wing, but part of the trailing edge or part of the fuselage or tail structure can be used as effectively. The arrangement comprises the concentrated coupling coil 1a, with or without a core, mounted on the outside of the framework 6, being fed with power by conductors passing through insulators 8a from the parts mounted inside the wing: that is adjustable condenser 2, coupling coil 3, condenser 4 and connection 5 to the transmitter and/or receiver. The arrangement shows the wing structure cut away to accommodate the coil, and the gap faired over by an insulating cover 9a to give minimum wind resistance, but the coil can project beyond the normal structure if conditions make it desirable.

Figure 6:
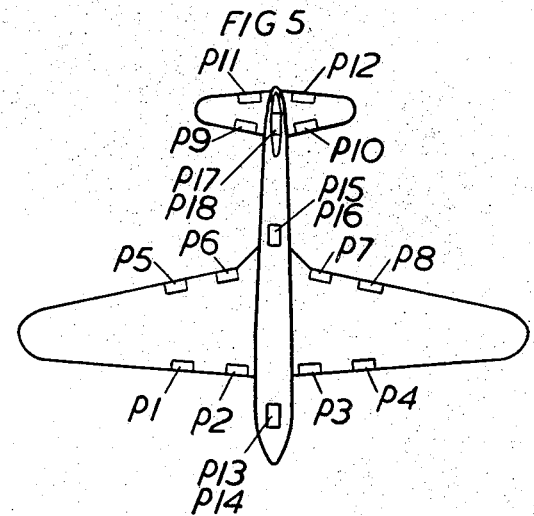
Figures 6 and 7 are plan views of aircraft illustrating possible positions for the coupling coil of the invention.

A number of these units can be mounted on one aircraft to give various radio communication channels and Fig. 6 shows a plan outline of an aircraft and indicates possible positions in which coils may be mounted.

When more than one unit is used to produce a particular excitation of the structure it will be necessary to provide means in the connections from the coupling coils to the transmitter and receiver to provide the phase displacement between the currents in the coils that will give the maximum effect or preferred radiation pattern. Such methods of phasing are well known and are not described.

The positions of the coupling coils indicated provide for obtaining various excitations of the aircraft structure, these being applied if necessary simultaneously. It should be noted, however, that if several different wavelengths are to be produced by using at least one coupling coil per wavelength, it may be necessary to provide filters or suppressors in the receiving circuits to enable reception on one wavelength to proceed while transmission on another wave length is going on.

In Figure 6 coupling coils at positions $p13$, $p15$, $p17$, are those on the top side of the aircraft while those at positions $p14$, $p16$ and $p18$ are those on the underside of the aircraft.

The positions of the coupling coils indicated in Fig. 6 provide among others for excitations as follows:

Coils at positions $p1$, $p2$, $p5$ and $p6$ separately or in combination will excite that wing to behave as a single dipole. Coils at positions $p3$, $p4$, $p7$ and/or $p8$ separately or in combination will excite that wing to behave as a single dipole.

Coils at positions $p9$ and/or $p11$ separately or in combination will excite that wing to behave as a single dipole.

Coils at positions $p10$ and/or $p12$ separately or in combination will excite that wing to behave as a single dipole.

Coils at positions $p13$, $p14$, $p15$, $p16$, $p17$ and/or $p18$ separately or in combination will excite the fuselage to behave as a single dipole.

Coils at positions $p1$, $p2$, $p3$, $p4$, $p5$, $p6$, $p7$ and/or $p8$ in conjunction with coils at positions $p13$, $p14$, $p15$, $p16$, $p17$ and/or $p18$ can be arranged by suitable phasing for the wing and fuselage to operate as a crossed-dipole.

In the arrangement in which the coupling coils provide for operation of the wing and fuselage as a crossed dipole it will be observed that the arrangement shows one embodiment wherein two structural parts whose longitudinal axes are mutually inclined are excited in the manner required to provide the necessary aerial characteristics. It is well known that polar diagrams giving reasonable circular symmetry in the places of the dipoles can be obtained by suitable adjustments of amplitude and phase of the currents flowing in crossed dipoles, for example, the well known "turnstile" arrangement using two crossed dipoles carrying currents of equal amplitude but differing in phase by 90°. Similar radiation patterns may be obtained in the aerial system according to the invention by so feeding, for example, the fuselage and wing of an aircraft that they carry currents of suitable amplitude and phase simultaneously.

Figure 7:
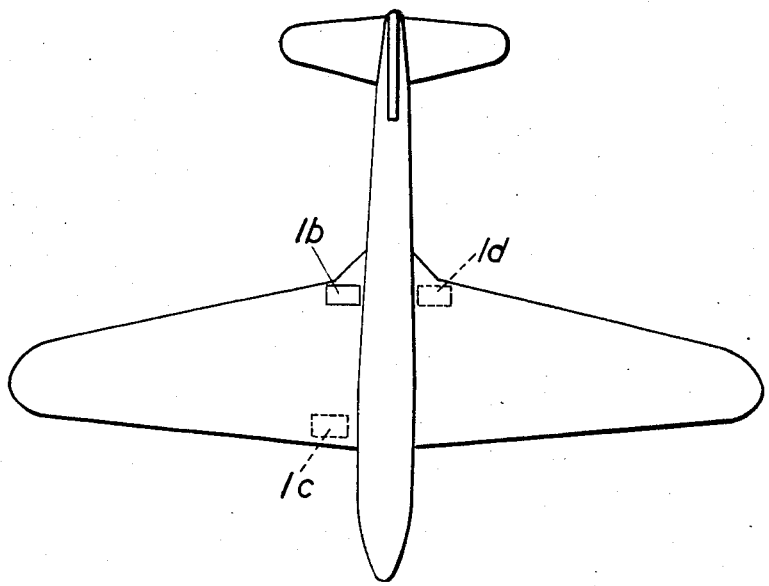

Excitation of the structural parts of the aircraft for this purpose may be effected in various ways of which an indication is given in Fig. 6. As an alternative the fuselage and wings can be fed simultaneously from toroidal coils wound round the fuselage and wing respectively, and fed with currents of appropriate magnitude and phase. Alternatively, a single coil 1b may be placed at the junction of one side of the fuselage with the wing and adjacent the leading edge or trailing edge of the wing as shown in Fig. 7 so that magnetic fields are excited or produced simultaneously in the wing and fuselage, the coil 1b constituting the coupling medium. The relative amounts of the currents flowing in the aerial system can be altered by varying the shape or position of the coupling coil but the phases of these currents will depend on the geometry of the aircraft. Further, the required phase difference is obtained from the fact that the wing and fuselage are in general of different physical and electrical lengths, and therefore the currents induced in them will differ in phase depending on the mechanical design of the aircraft.

The aforesaid phase and amplitude of the currents may be made independent of the aircraft shape by the use of a plurality such as, for example, three coupling coils 1b, 1c, 1d each located adjacent the junction of the wing and fuselage, one coil being adjacent the leading or trailing edge on one side of the fuselage and the other two being adjacent the leading and trailing edges respectively on the other side of the fuselage. Fig. 7 shows possible arrangements with the coils 1c and 1d shown in dotted lines to distinguish from the embodiment using a single coil 1b.

In the use of the arrangement shown in Fig. 7 coils 1b and 1d are used principally to reinforce the currents in the fuselage and wings respectively produced by coil 1c. By alternating the magnitude and phase of the currents in coil 1b and 1d relative to those in coil 1c a suitable measure of control may be obtained by the relative magnitude and phases of the currents in the wings and fuselage, thereby achieving corresponding control over the polar diagram of radiation.

Figure 8:
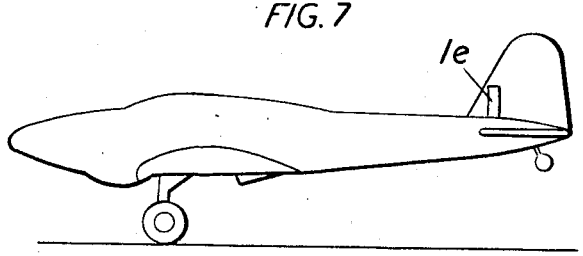
Figure 8 is a side view of an aircraft showing another possible position for the coupling coil.

Various alternatives in the position of the coupling coils are available other than those shown in the previous figures. Thus a coupling coil 1e may be placed adjacent to or in the vertical tail member of an aircraft as shown in Fig. 8, this tail member being either wholly metallic or having that portion adjacent the coil metallic so that the necessary inductive effect may be produced to constitute the required aerial characteristics.

I claim:

In combination, a metal skinned aircraft wing structure electro-magnetically coupled to a radio transmitter or receiver by means of a coil located near one edge of one wing close to the fuselage, the axis of the coil being normal to the plane of the wing, whereby the wings function as a dipole coupled asymmetrically to the coil and, due to this asymmetry, the fuselage functions as a dipole parasitic to the wings and a useful field obtains at all aspects in azimuth.

WILLIAM ARTHUR JOHNSON.

REFERENCES CITED

The following references are of record in the file of this patent:

UNITED STATES PATENTS

| Number | Name | Date |
|---|---|---|
| 2,129,852 | Leib | Sept. 13, 1930 |
| 2,235,139 | Bruce | Mar. 18, 1941 |
| 2,404,093 | Roberts | July 16, 1946 |

FOREIGN PATENTS

| Number | Country | Date |
|---|---|---|
| 844,545 | France | July 26, 1939 |